(12) United States Patent
Mertens et al.

(10) Patent No.: US 10,866,926 B2
(45) Date of Patent: Dec. 15, 2020

(54) HYBRID SEARCH INTERFACE

(71) Applicant: Dropbox, Inc., San Francisco, CA (US)

(72) Inventors: Timo Mertens, Millbrae, CA (US);
Mariana Stepp, Santa Clara, CA (US);
Sam Jau, San Francisco, CA (US);
Michael Wu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 132 days.

(21) Appl. No.: 15/836,498

(22) Filed: Dec. 8, 2017

(65) Prior Publication Data

US 2019/0179922 A1    Jun. 13, 2019

(51) Int. Cl.
| | |
|---|---|
| *G06F 16/14* | (2019.01) |
| *G06F 16/9535* | (2019.01) |
| *G06F 16/9032* | (2019.01) |
| *G06F 16/16* | (2019.01) |

(52) U.S. Cl.
CPC ........ *G06F 16/156* (2019.01); *G06F 16/9032* (2019.01); *G06F 16/9535* (2019.01); *G06F 16/168* (2019.01)

(58) Field of Classification Search
CPC .... G06F 17/30; G06F 16/156; G06F 16/9535; G06F 16/168; G06F 16/14; G06F 16/144; G06F 16/148; G06F 16/152
USPC ........................................................ 707/825
See application file for complete search history.

(56) References Cited

U.S. PATENT DOCUMENTS

| | | |
|---|---|---|
| 6,389,412 B1 | 5/2002 | Light |
| 6,751,603 B1 | 6/2004 | Bauer et al. |
| 7,437,353 B2 | 10/2008 | Marmaros et al. |
| 7,508,419 B2 | 3/2009 | Toyama et al. |
| 7,634,517 B1 | 12/2009 | Burrows et al. |
| 7,769,794 B2 | 8/2010 | Moore et al. |
| 7,890,886 B2 | 2/2011 | Matthews et al. |
| 8,024,335 B2 | 9/2011 | Anthony et al. |
| 8,126,895 B2 | 2/2012 | Sargent et al. |
| 8,359,306 B2 | 1/2013 | Kim et al. |
| 8,478,763 B2 | 7/2013 | Anderson et al. |
| 8,620,923 B1 | 12/2013 | Wormley et al. |
| 8,682,901 B1 | 3/2014 | Cao et al. |
| 8,756,215 B2 | 6/2014 | Shikha |
| 8,868,574 B2 | 10/2014 | Kiang et al. |

(Continued)

FOREIGN PATENT DOCUMENTS

| | | |
|---|---|---|
| WO | 2005114470 | 12/2005 |
| WO | 2015/035230 A1 | 3/2015 |

OTHER PUBLICATIONS

Parker-Wood et al., "Security Aware Partitioning for Efficient File System Search", IEEE, 2010, pp. 1-14.

(Continued)

*Primary Examiner* — Giovanna B Colan
(74) *Attorney, Agent, or Firm* — Polsinelli PC

(57) ABSTRACT

The disclosed technology relates to a system configured to receive a first input into a search interface and perform a first search based on the first input, wherein the first search is performed on a first set of content items managed by a content management system. The system further receives a second input into the search interface and performs, in response to receiving the second input, a second search based on the first input, wherein the second search is performed on a second set of content items managed by the content management system.

24 Claims, 9 Drawing Sheets

(56) References Cited

U.S. PATENT DOCUMENTS

| | | |
|---|---|---|
| 8,868,677 B2 | 10/2014 | Molaro et al. |
| 9,020,989 B2 | 4/2015 | Arrouye et al. |
| 9,116,911 B2 | 8/2015 | Broussard et al. |
| 9,223,460 B2 | 12/2015 | Naranjo et al. |
| 9,245,004 B1 | 1/2016 | Kamvar et al. |
| 9,298,851 B2 | 3/2016 | Nierenberg |
| 9,384,226 B1* | 7/2016 | Goel .................. G06F 16/319 |
| 10,607,271 B1* | 3/2020 | Mehta .............. G06F 16/24578 |
| 2002/0078134 A1 | 6/2002 | Stone et al. |
| 2004/0083091 A1 | 4/2004 | Ie et al. |
| 2004/0220926 A1* | 11/2004 | Lamkin .................. G06F 21/10 |
| 2005/0028082 A1 | 2/2005 | Topalov et al. |
| 2006/0031198 A1 | 2/2006 | Newbold et al. |
| 2006/0089938 A1* | 4/2006 | Leonard .................. H04L 41/00 |
| 2006/0235855 A1* | 10/2006 | Rousseau ................ G06F 16/48 |
| 2008/0005184 A1 | 1/2008 | Myllyla et al. |
| 2008/0243788 A1 | 10/2008 | Reztlaff et al. |
| 2008/0243828 A1 | 10/2008 | Reztlaff et al. |
| 2008/0250021 A1 | 10/2008 | Boys et al. |
| 2008/0294674 A1 | 11/2008 | Reztlaff, II et al. |
| 2008/0313198 A1 | 12/2008 | Kim et al. |
| 2009/0106674 A1* | 4/2009 | Bray .................... G06F 16/156 715/762 |
| 2009/0228528 A1 | 9/2009 | Ercegovac et al. |
| 2009/0228825 A1* | 9/2009 | Van Os ................ G06F 3/0488 715/780 |
| 2009/0274158 A1 | 11/2009 | Sharp et al. |
| 2009/0276401 A1 | 11/2009 | Groble et al. |
| 2009/0292677 A1* | 11/2009 | Kim ...................... G06F 16/958 |
| 2010/0063877 A1* | 3/2010 | Soroca ................ G06F 16/9577 705/14.45 |
| 2010/0174709 A1 | 7/2010 | Hansen et al. |
| 2011/0202541 A1 | 8/2011 | Permandla et al. |
| 2011/0225627 A1 | 9/2011 | Uchida et al. |
| 2011/0258198 A1 | 10/2011 | Sun et al. |
| 2012/0131009 A1 | 5/2012 | Nath et al. |
| 2012/0150796 A1 | 6/2012 | Martick |
| 2012/0150864 A1 | 6/2012 | Palakodety et al. |
| 2012/0173373 A1* | 7/2012 | Soroca ................ G06F 16/9535 705/26.3 |
| 2012/0221610 A1* | 8/2012 | Murphy .................. G06F 16/68 707/825 |
| 2012/0233209 A1 | 9/2012 | Cheng et al. |
| 2013/0191414 A1 | 7/2013 | Srivastava et al. |
| 2013/0275548 A1 | 10/2013 | Molaro et al. |
| 2013/0332575 A1 | 12/2013 | Song et al. |
| 2014/0019405 A1 | 1/2014 | Borthakur et al. |
| 2014/0032703 A1 | 1/2014 | Wormley et al. |
| 2014/0047359 A1 | 2/2014 | Teigene et al. |
| 2014/0058732 A1 | 2/2014 | Labsky et al. |
| 2014/0095467 A1 | 4/2014 | Bueche et al. |
| 2014/0136543 A1 | 5/2014 | Frieden et al. |
| 2014/0156669 A1 | 6/2014 | Bali et al. |
| 2014/0201197 A1 | 7/2014 | Kumar et al. |
| 2014/0244618 A1 | 8/2014 | Lynch et al. |
| 2014/0358909 A1 | 12/2014 | Kolba, Jr. et al. |
| 2015/0112996 A1 | 4/2015 | Mishra et al. |
| 2015/0186538 A1* | 7/2015 | Yan .................... G06F 16/2246 707/722 |
| 2015/0281401 A1 | 10/2015 | Le et al. |
| 2016/0012136 A1 | 1/2016 | Zvi et al. |
| 2016/0055188 A1 | 2/2016 | Goel et al. |
| 2016/0127347 A1 | 5/2016 | Childs et al. |
| 2017/0041296 A1* | 2/2017 | Ford .................... H04L 63/0421 |
| 2017/0147569 A1* | 5/2017 | Mizobuchi ............ G06F 16/248 |
| 2017/0357725 A1* | 12/2017 | Hornkvist ............. G06F 16/164 |

OTHER PUBLICATIONS

European Claims in application No. PCT/US2015/030474, dated Nov. 2015, 10 pages.

Claims in application No. PCT/US2015/030474, dated Aug. 2015, 10 pages.

Claims in application No. PCT/US2015/030476, dated Nov. 2015, 9 pages.

International Search Report in application No. PCT/US2015/030476, dated Aug. 19, 2015, 3 pages.

International Search Report in application No. PCT/US2015/030474, dated Nov. 20, 2015, 6 pages.

Paul Pocatilu et al., "Syncing Mobile Applications with Cloud Storage Services," Informatica Economica, vol. 17, No. 2, 2013, pp. 96-108.

\* cited by examiner

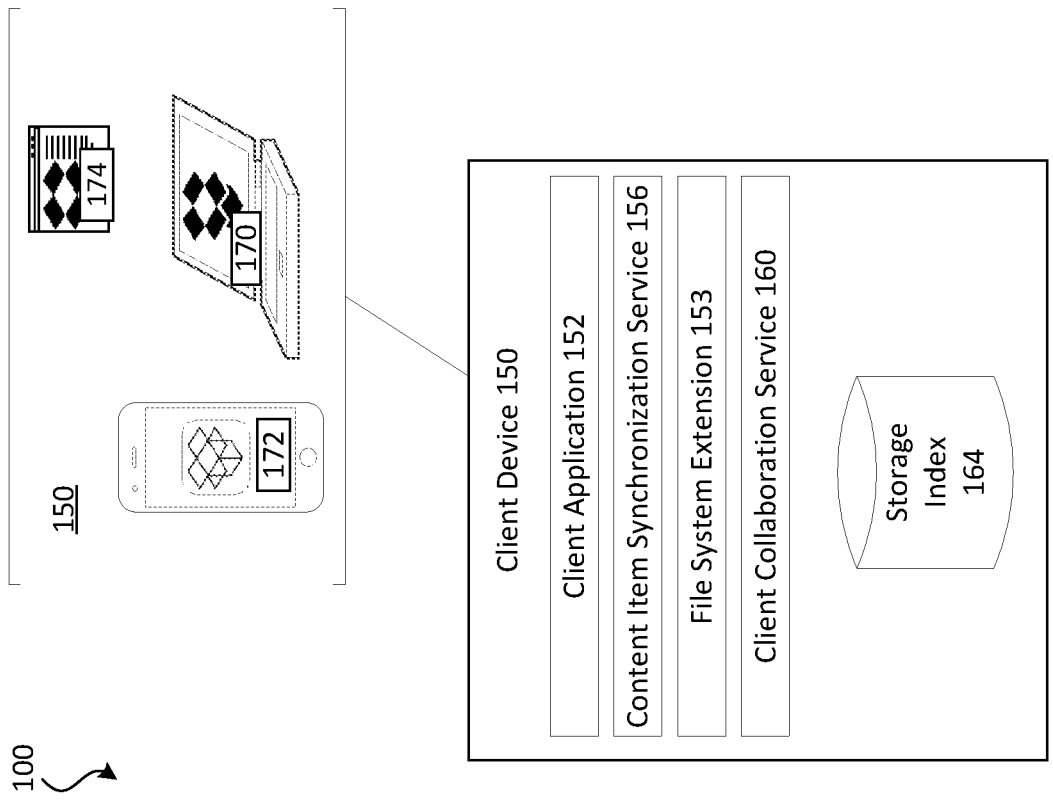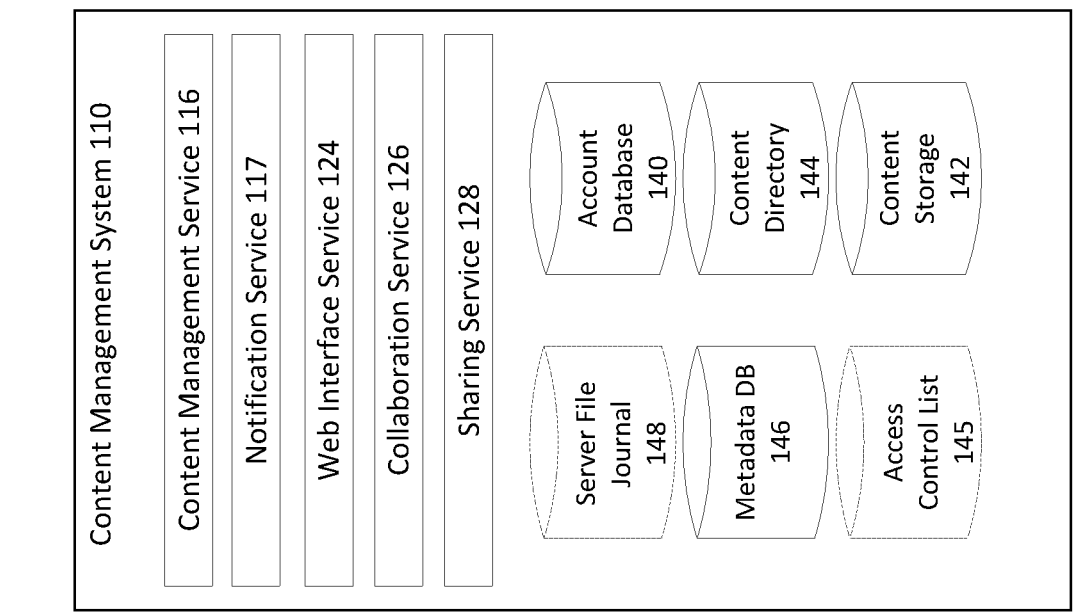
FIG. 1A

FIG. 3

Search results

| | Name | Modified |
|---|---|---|
| | apollo<br>Spaces | |
| | Ref - Apollo<br>Team files North Star | |
| | Apollo Home v1.sketch<br>Desk 1cp | 9 mins ago<br>Mich Siritz |
| | apollo<br>Start Services | |
| | ApolloMacOSv0.5.framer<br>Ref Apollo | |
| | apollo insolrations<br>Week 4 | 1 days ago<br>Sam Jay |
| | Apollo Home v5.sketch<br>Desk 1cp | |
| | apollo flow<br>Spaces | |
| | Apollo<br>Start Servces | |
| | paper-apollo-sketch<br>C1 Sketch | 8 days ago<br>Angela Gorden |
| | review-apollo-sketch<br>final | 7 days ago<br>Andrew Chin |

FIG. 5

HYBRID SEARCH INTERFACE

BACKGROUND

Computing technologies have enabled users to access countless resources over various networks as well as store content items or other resources locally on one or more client devices. There are so many resources available to users that actually finding a desired resource is quite difficult. Internet search engines are commonly used to locate resources across the web. For example, a user may open a web page associated with an internet search engine and search for desired web resources by entering a search term in the search field.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1A shows an example of a content management system and client devices, in accordance with some embodiments;

FIG. 3 shows an example graphical user interface, in accordance with various embodiments of the subject technology;

FIG. 5 shows an example hybrid search interface, in accordance with various embodiments of the subject technology;

DETAILED DESCRIPTION

Figure 1B:
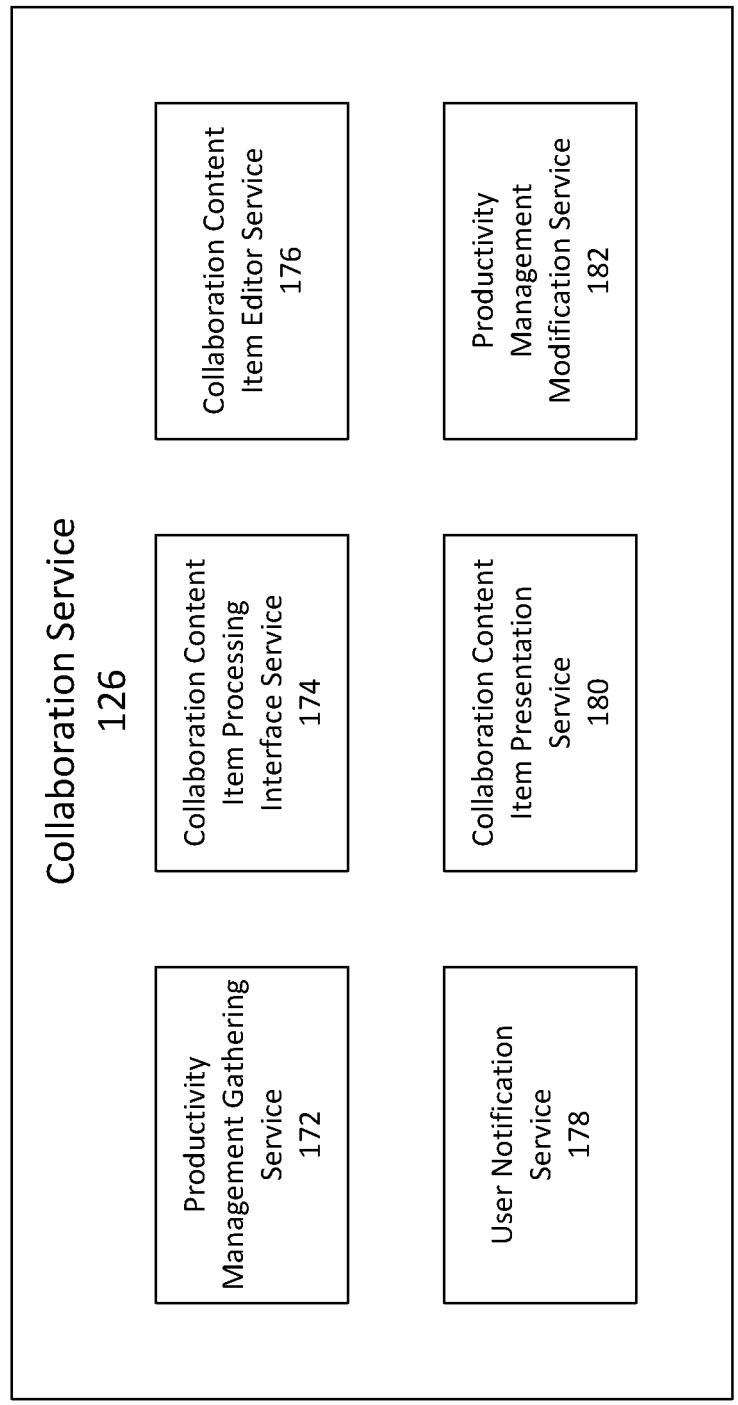
FIG. 1B shows an example collaboration service, in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Computing storage and networking technologies allowed users to reach resources that, in previous times, would have been unimaginable. However, there is now so much data potentially available to a user that this data is difficult to sift through and identify desired content. This data may be stored locally on the user's client device or remotely. The remotely stored information may be private or restricted and accessible to the public. For example, data may be stored for the user or a group that includes the user by a cloud service (e.g., a content management system) and made accessible via the user's user account credentials.

Some search technologies allow users to search available sets of data, however these search technologies are sometimes both over inclusive and under inclusive at the same time. For example, each search interface is configured to search one set of data. An internet search engine may be configured to search all content indexed by a web crawler associated with the internet search engine, a website search interface may be configured to search all content hosted by a domain associated with the website, and a file system search engine may be configured to search all content in a particular folder. However, a file system search engine is not configured to search data that is stored remotely and an internet search engine is not configured to search data stored locally.

Accordingly, a user typically must determine which data set to search, select a search tool appropriate for that data set, and use the search interface for the selected search tool. If multiple data sets are to be searched, multiple search tools may be needed. Users are unable to search multiple data sets using the same search interface and users would not be able to easily control which data sets are searched through the same search interface.

The disclosed technology addresses the need in the art for a hybrid search interface. The hybrid search interface enables a user to perform two modes of search using the same search interface. For example, the hybrid search interface enables a user to search for content local to a user's client device as well as content that is remotely stored. Alternatively, or additionally, the hybrid search interface may enable a user to search for content items that have been accessed within a recent period of time in one mode as well as all content that is managed by a content management system in a second mode. As will be described in further detail, the hybrid search interface also enables users to easily control which data sets are searched. The hybrid search interface is especially useful in the context of content management services and the platforms that provide them.

Content management services allow users to access and manage content items across multiple devices using a network. The content items may be stored locally on a client device, remotely on a server associated with the content management service, remotely on other client devices, or some combination. Furthermore, in some cases, there may be different versions of the same content item across the servers and devices. Some content management services may allow users to share content items with other users in order to aid collaboration. In a typical content management service, a user establishes a content management account with the service provider and can associate various content items with the content management account. For example, content management services may allow the user to store content items (including but not limited to text documents; email messages; text messages; other types of messages; media files such as photos, videos, and audio files; and/or folders containing multiple files).

The subject technology provides a hybrid search interface for a content management platform. The hybrid search interface enables a user to search for content items managed by a content management system that are stored locally on a client device as well as content items managed by a content management system that are remotely stored. The same hybrid search interface may also allow users to easily control which data sets are searched, thus saving space on a display device. Saving space on a display device may be especially important when the display for the client device is small (e.g., on a mobile device) or when there are other interface elements (e.g., search results) that should also be displayed.

The subject technology further addresses a number of other technical problems and obstacles rooted in computer and network technology as well. For example, some searches require more processing time, processing cycles, bandwidth, memory, and, as a result, energy to execute properly. To illustrate, remote searches typically require more network bandwidth and processing time to execute than searches of local sets of data. Also, larger sets of data may require more memory and/or processing time to execute. In cases where a client device is offline (e.g., does not have network or internet access), no remote search may be performed.

Aspects of the subject technology provide a technical framework and solution to address these and other technical problems by, for example, enabling users to easily control which data sets are searched. The different data sets may include, for example, content items that have been recently accessed by the user, all content items available to the user, content items local to the user's client device, and/or remote content items managed by the content management system.

In some embodiments, the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116.

Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, and delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, or move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

FIG. 1B shows an example collaboration service 126, according to some embodiments. Collaboration service 126 may include productivity management gathering service 172, collaboration content item processing interface service 174, collaboration content item editor service 176, user notification service 178, collaboration content item presentation service 180, and productivity management modification service 182. One or more of productivity management gathering service 172, collaboration content item processing interface service 174, collaboration content item editor service 176, user notification service 178, collaboration content item presentation service 180, and productivity management modification service 182 may be coupled to one another or to services not explicitly shown.

Productivity management gathering service 172 may be configured to gather productivity data from productivity management system 140. In various embodiments, productivity management gathering service 172 identifies an event and gathers information related to the event. For instance, productivity management gathering service 172 may gather a specific calendar entry and/or a specific task from an online calendar. Productivity management gathering service 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other services of collaboration service 126.

Collaboration content item processing interface service 174 may be configured to interface with collaboration service 126. In various embodiments, collaboration content item processing interface service 174 may provide collaboration content items to one or more services of collaboration service 126, as described further herein.

Collaboration content item editor service 176 may be configured to create and/or modify collaboration content items. A collaboration content item may be created in a variety of ways. In some embodiments, collaboration content item editor service 176 enables creation of the collaboration content item into the content management system 106. Collaboration content item editor service 176 may enable access to or be any collaboration content item editing application (e.g., Microsoft Word®, Google Docs®, or the like) either in the cloud or executed locally. In one example, content management system 106 may provide to one of client devices 102 a user interface element (e.g., a box or a button) that allows creation of a new collaboration content item.

In some embodiments, collaboration content item editor service 176 may create the collaboration content item in conjunction with the productivity management system 140. For example, collaboration content item editor service 176 may provide a suggestion to a user to create or invoke a collaboration content item associated with an upcoming event. In various embodiments, collaboration service 126 may identify a user that is opening or otherwise using collaboration content item editor service 176. Productivity management gathering service 172 may identify an upcoming event for the user on the user's calendar. Subsequently, collaboration content item editor service 176 may provide a suggestion to the user to create or invoke the collaboration content item associated with the upcoming event.

Although it is discussed that collaboration content item editor service 176 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor service 176 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor service 176 may configure the productivity management system 140 to provide access to the collaboration content item (e.g., using a link, including the collaboration content item, or any other mechanism to enable access to the collaboration content item) in a meeting request, a task entry, or the like. In some embodiments, collaboration content item editor service 176 may instruct productivity management system 140 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 102) access to a collaboration content item stored in content management system 106 (e.g., in storage accessible through the cloud) or in productivity management system 140.

Once the user requests to create or invoke the collaboration content item, collaboration content item editor service 176 may create and/or invoke a collaboration content item. The collaboration content item may be subsequently edited, altered, viewed, changed, stored, and/or the like by an editing application (e.g., either stored locally on a client device 102 or in the cloud). In various embodiments, one or more different client devices 102 may utilize different editing applications to make changes to the collaboration content item. Collaboration content item editor service 176 and/or other editing applications may allow for the collaboration content item to be changed by multiple different users using different client devices 102 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor service 176 may receive from users additional content for the collaboration content item. For example, collaboration content item editor service 176 may be configured to receive from the client devices 102 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor service 176 may obtain edits (e.g., text changes and/or additions of audio files, pictures, tables, or the like) from any number of client devices 102 at a given time (or in real time). Collaboration edits may be incorporated in a variety of formats, including formats that provide different text attributes such as colors, fonts, styles, or the like for different users.

In various embodiments, collaboration content item editor service 176 (and or a security or permissions service associated with a server) may establish permissions and/or security for the collaboration content item. For example, collaboration content item editor service 176 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways. For example, the +primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ] @kingHenry" can be interpreted such that @kingHenry links to a user with the username "kingHenry," and this link is used by the primitive "[ ]" to creates a new task, where that task is assigned to the kingHenry user.

In various embodiments, collaborative content item editor service 176 (and or a security or permissions service associated with a server) may establish permissions and/or security for the collaborative content item. For example, collaborative content item editor service 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 178 may be configured to notify users of each of the client devices 102 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 178 provides notifications about changes to the client devices 102. For example, user notification service 178 may notify users whether a collaboration content item has been created for an event. As another example, user notification service 178 may notify specific users that they have been invited to attend an event.

Collaboration content item presentation service 180 may provide to the client devices 102 selected collaboration content items. The collaboration content items may be displayed in the client devices 102 through a native application, an Internet browsing window, or the like supported by the client devices 102.

It will be appreciated that collaboration content item presentation service 180 may restrict writing permissions to the collaboration content items at any time. In an example, prior to occurrence of the event, collaboration content item presentation service 180 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 180 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 182 may be configured to coordinate collaboration content items with calendar entries and to enable access to the collaboration content item through calendar entries.

Figure 1C:
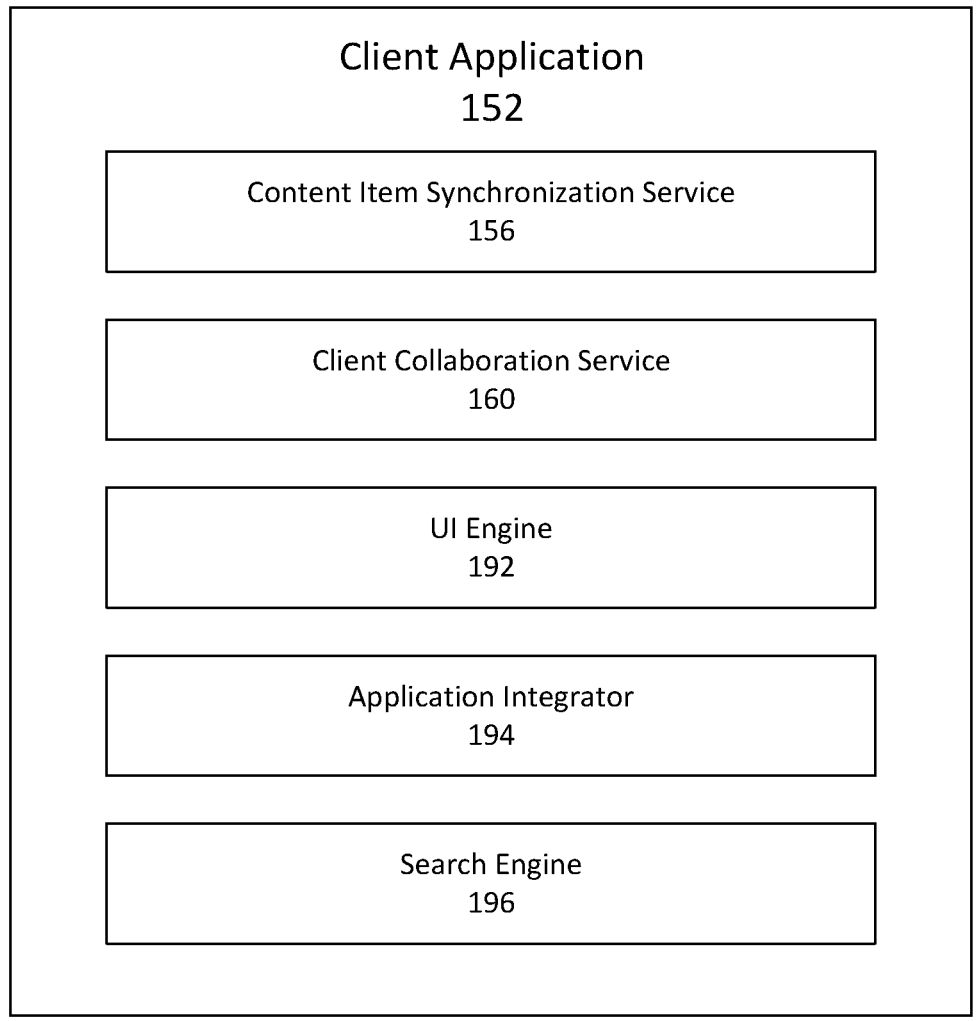
FIG. 1C shows an example client application, in accordance with some embodiments.

FIG. 1C shows an example client application 152, in accordance with some embodiments. Client application 152, running on a client device, enables client devices to access content management system 110. Client application 152 can include a content item synchronization service 156, a client collaboration service 160, a search engine 192, a user interface (UI) engine, and an application integrator 196.

As noted above, content item synchronization service 156 can be in communication with content management service 116 to synchronize changes to content items between client device 150 and content management system 110. Client collaboration service 160 may be configured to provide a native application companion interface for the purpose of displaying information relevant to a content item being presented on client device 150.

However, in some scenarios, there may be no native application companion to display a content item or the user may prefer to view a content item via the client application 152. In other cases, certain content items (e.g., collaboration documents) are primarily stored by content management system 110 such that native applications are unable to access the content items. A web browser may be used to access content management system 110, however, the use of the web browser may be awkward and result in a suboptimal user experience.

According to some embodiments, client application 152 may include a UI engine 192 configured to access content items managed by the content management system 110 and display them to a user. The content items may be locally stored versions of the content items or versions of content items stored remotely at content management system 110. The UI engine 192 may provide users with a less distracting, more natural user experience and enable multiple content items to be open and/or displayed at once in client application 152.

Application integrator 194 may be configured to interface between other native applications on the client device. According to some embodiments, the application integrator 194 may leverage the processing, editing, viewing, compatibility, or other functionalities of other native applications in order to enable the UI engine 192 to provide the user with access to content items within client application 152 that the UI engine 192 may otherwise not be compatible with. Application integrator 194 may act as an interface between client application 152 and other native applications on the client device to enable workflows between them.

Search engine 196 may be configured to locate content items managed by the content management system 110. Search engine 196 may be configured to receive search input, such as a search term or search parameters, and search for content items that match the search input. Search engine 196 may interface with the file system of a client device to search locally stored content items managed by the content management system and/or interface with the content management system 110 to access remotely stored content items managed by the content management system.

According to some embodiments, search interface 196 may enable UI engine 192 to display a hybrid search interface for a user in the client application 152. The hybrid search interface enables a user to search for content local to a user's client device as well as content that is remotely stored within the same search interface. Furthermore, the hybrid search interface enables users to easily control which data sets are searched with minimal input and distraction from the user's workflow.

Figure 2:
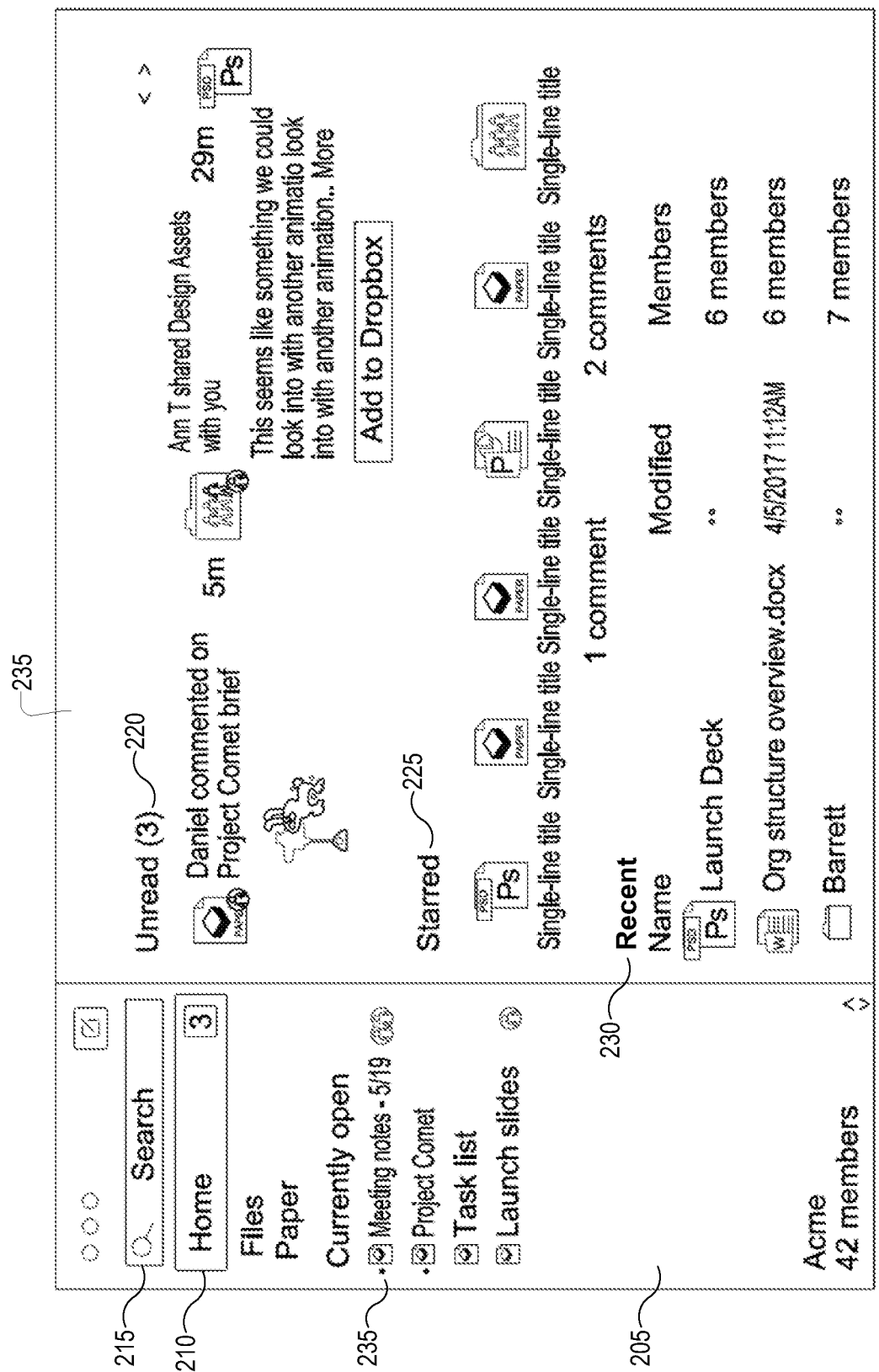
FIG. 2 shows an example graphical user interface, in accordance with various embodiments of the subject technology.

FIG. 2 shows an example graphical user interface 200, in accordance with various embodiments of the subject technology. The graphical user interface 200 may be provided by a client application running on a client device such as client application 152 in FIG. 1C. The client application may be configured to interface with the content management system and the file system on the client device to display a workspace for content items managed by the content management system.

The graphical user interface 200 may include an interface element such as a side navigation bar 205 that enables a user to navigate between content items and other features of the client application. In the example shown in graphical user interface 200, side navigation bar 205 enables a user to select a home view, file type content items, or paper type content items (e.g., collaboration documents). As seen in FIG. 2, the home view is currently selected and highlighted 210 for the easy recognition. Side navigation bar 205 also includes a view of currently open content items and a visualization of other users that may be viewing or editing the content items.

The home view shown in a main panel 235 of graphical user interface 200 includes a list of unread notifications or messages 220 associated with the content management system, a list of starred content items 225 or bookmarked content items, and a list of recently accessed content items 230 along with related information (e.g., a time stamp for the last action associated with each content item and a list of users with access to each content item).

Side navigation bar 205 may also include search interface 215 configured to receive search input interface with a search engine such as search engine 196 in FIG. 1C to search for content items that match the search input. Search interface 215 may be a hybrid search interface configured to be able to search locally stored content items managed by the content management system and/or search remotely stored content items managed by the content management system.

As noted above, side navigation bar 205 enables a user to navigate between content items and other features of the client application. Accordingly, a user may quickly navigate between different views provided by the client application, including selecting between a number of currently open content items. In an illustrative example, a user can select the currently open content item 235 entitled "Meeting Notes—5/19." In response to the user selection, the client application may retrieve and display a view of the currently open content item 235 entitled "Meeting Notes—5/19," such as the view shown in the graphical user interface 300 of FIG. 3.

Figure 3:
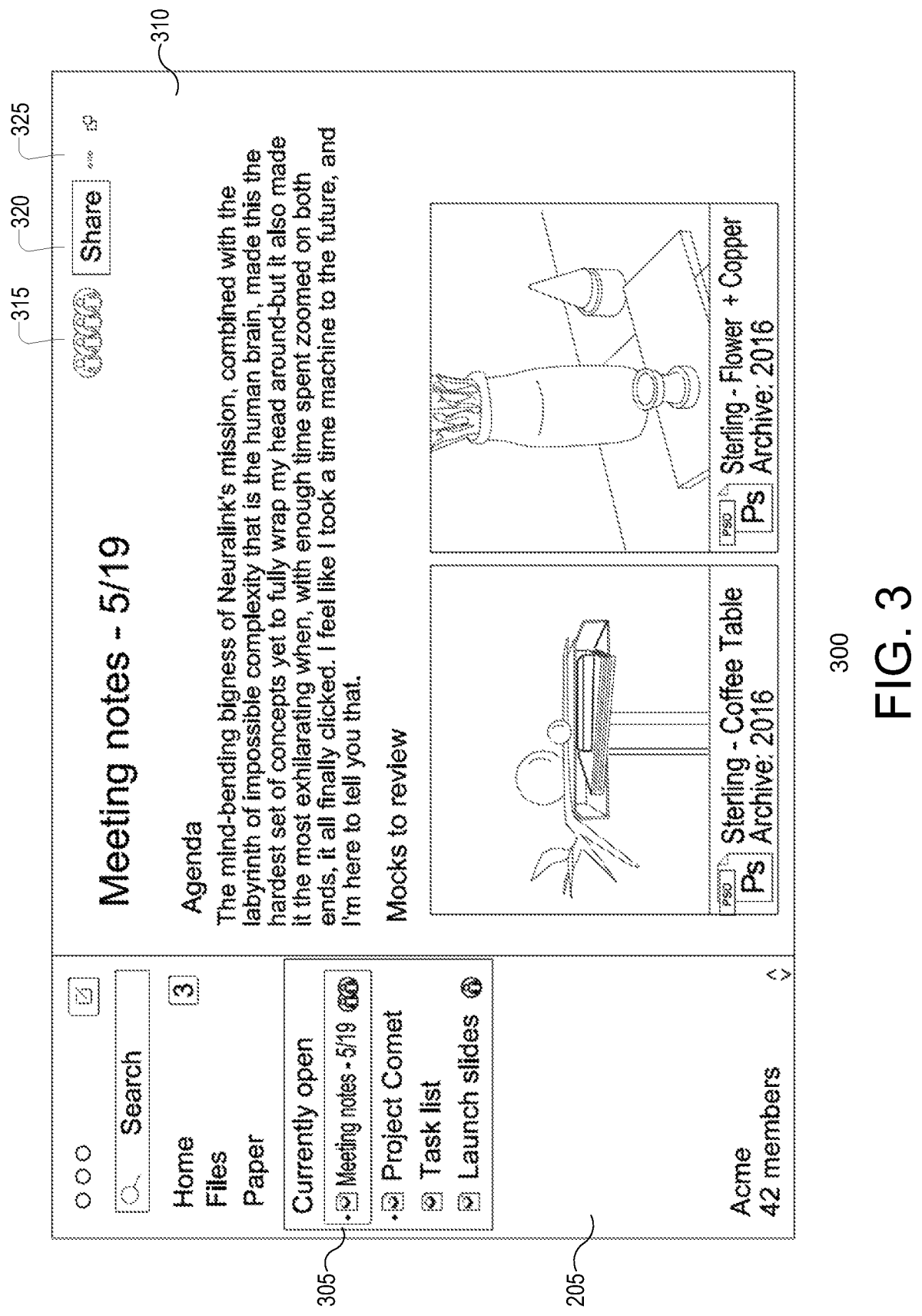

FIG. 3 shows an example graphical user interface 300, in accordance with various embodiments of the subject technology. The graphical user interface 200 may be provided by a client application running on a client device such as client application 152 in FIG. 1C. The client application may be configured to interface with the content management system and the file system on the client device to display a workspace for content items managed by the content management system.

In graphical user interface 300, side navigation bar 205 from FIG. 2 may be persisted and remain as a convenient way for a user to navigate between content items and other features of the client application. As seen in navigation bar 205, the user has selected the currently open content item 205 entitled "Meeting Notes—5/19." In response to the user selection, the client application may retrieve and display the selected content item in main panel 310. The user may view, edit, or perform other supported tasks in main panel 310. The viewing frame may also include additional interface elements that allow the user to perform additional tasks such as view and/or select other users currently viewing the selected content item 315, share the selected content item with other users 320, or view a menu of additional supported tasks 325.

Figure 4:
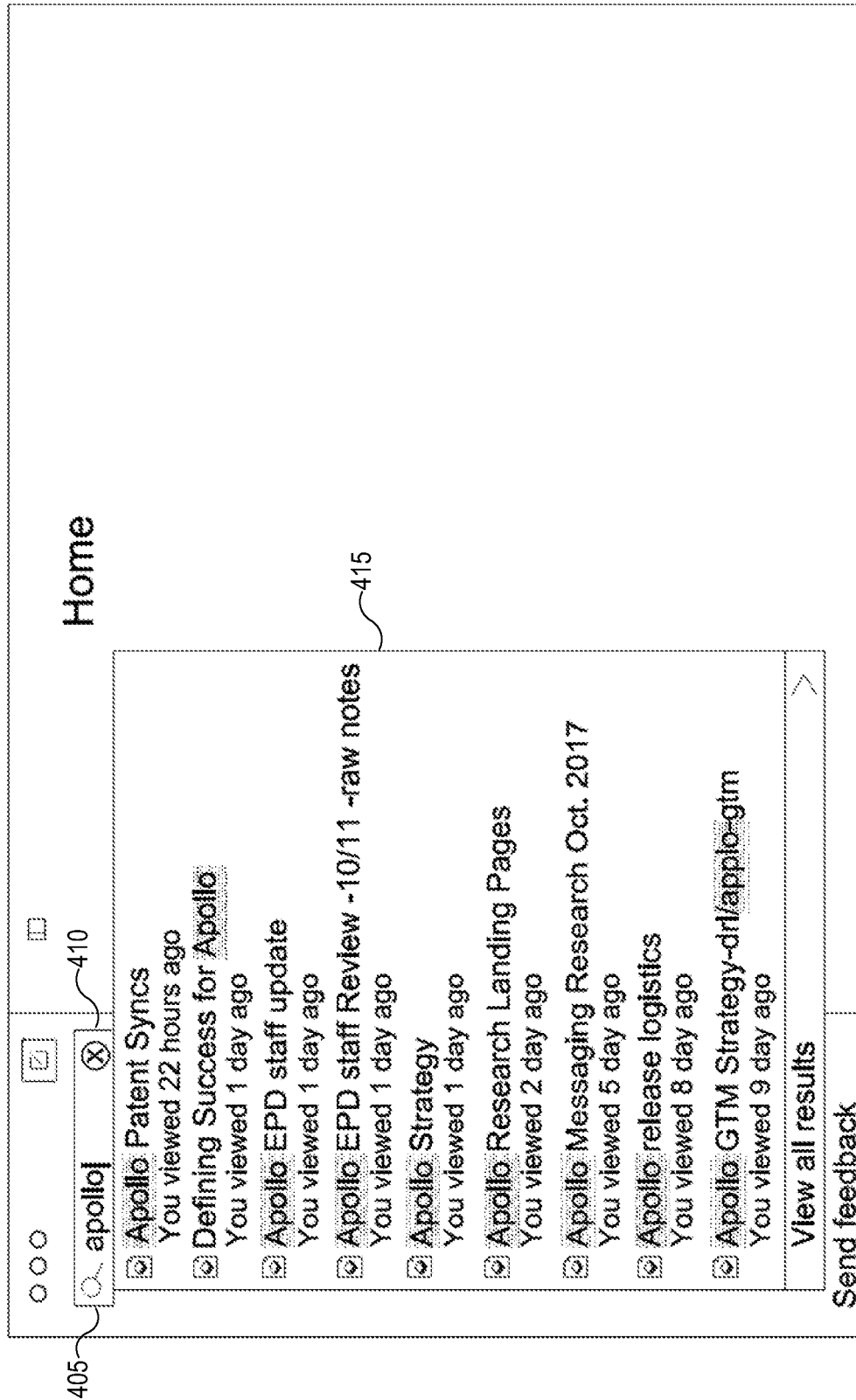
FIG. 4 shows an example hybrid search interface, in accordance with various embodiments of the subject technology.

FIG. 4 shows an example hybrid search interface, in accordance with various embodiments of the subject technology. The hybrid search interface may be provided by a client application running on a client device such as client application 152 in FIG. 1C. The client application may include a graphical user interface 400 that includes the hybrid search interface 405.

The hybrid search interface enables a user to perform two modes of search using the same search interface. For example, hybrid search interface 405 includes a search field 410 configured to receive a search input from a user. The search input may include, for example, search terms, search parameters, regular expressions, etc. As the search input is received, a first search may be dynamically performed. For example, as each letter of a search term is inputted into the search field 410, the search engine of the client application may perform a first search according to a first search mode. The search results of the first search may be provided in a first search result interface element 415.

The first search mode may be, for example, on a first set of content items managed by a content management system that may share one or more characteristics. For example, the first set of content items may be recently accessed content items (e.g., content items accessed by the searching user within a past week, day, 10 days, or other time period), content items that are stored locally on the client device, a certain type of content items (e.g., collaboration documents), or some combination of characteristics.

To perform the second mode of search, the user can input additional input into the same search field. For example, the user can input the enter key or some other specialized key or button in search field 410 to perform the second mode of search which, for the sake of illustration, results in the graphical user interface 500 of FIG. 5.

FIG. 5 shows an example hybrid search interface, in accordance with various embodiments of the subject technology. The hybrid search interface may be provided by a client application running on a client device such as client application 152 in FIG. 1C. The client application may include a graphical user interface 500 that includes the hybrid search interface 505.

As noted above, the user may input a second type of input into the search field 510, which results in the search engine of the client application performing a second search according to a second search mode. The second type of input may be, for example an enter key or some other specialized (e.g., not text) input. The search results of the second search may be provided in a second search result interface element 515.

The second search mode may be, for example, on a second set of content items managed by a content management system that may share one or more characteristics. For example, the second set of content items may be all content items accessed by the user, all content items that the user has the ability to access, content items that are stored remotely from the client device by the content management system, content items that are stored locally or remotely, or some combination of characteristics. The second set of content items may, in some cases, also include the first set of content items.

According to some embodiments, if the client device does not have network connectivity or is otherwise unable to communicate with the content management system, client application 152 may not be able to access content item stored by the content management system. Accordingly, the second search result interface element 515 may instead display search results that are located on the client device. For example, if the first set of content items are content items located on the client device accessed by the user within a past week, the second search result interface element 515 may display all content items located on the client device, all content items located on the client device ever accessed by the user, all content items located on the client device ever accessed by any user within the past week, or any other alternate search criteria. According to some embodiments, client application 152 may determine the alternate search criteria for the second search mode based on whether the client device is able to communicate with the content management system.

The dual mode search capabilities of the hybrid search interface provides a user with more intuitive control over what set of content items to search. The control over which mode of search to perform is also accomplished more efficiently and with fewer steps required from the user. Furthermore, providing multiple modes of search within the same interface increases the density of functionality provided by the interface and reduces the space needed to provide those modes of search. This may be especially important when screen real estate is limited. According to some embodiments, the user may not be aware that two different sources are being searched or two different modes of search are being performed. Instead, the process is transparent to the user.

According to some embodiments, performing a first search on a first set of content items allows for a number of technical improvements and solutions as well. For example, performing the first search on a smaller set of content items reduces the processing time and processing cycles needed to perform the search. If the first set of content items are local content items, the search may also be performed without network connectivity. If a desired content item can be identified within the first set of content items, additional processing operations and computing resources may be conserved and a user may locate a desired content item faster. Otherwise, a search on the second set of content items may still easily be searched using the same hybrid search interface.

Figure 6:
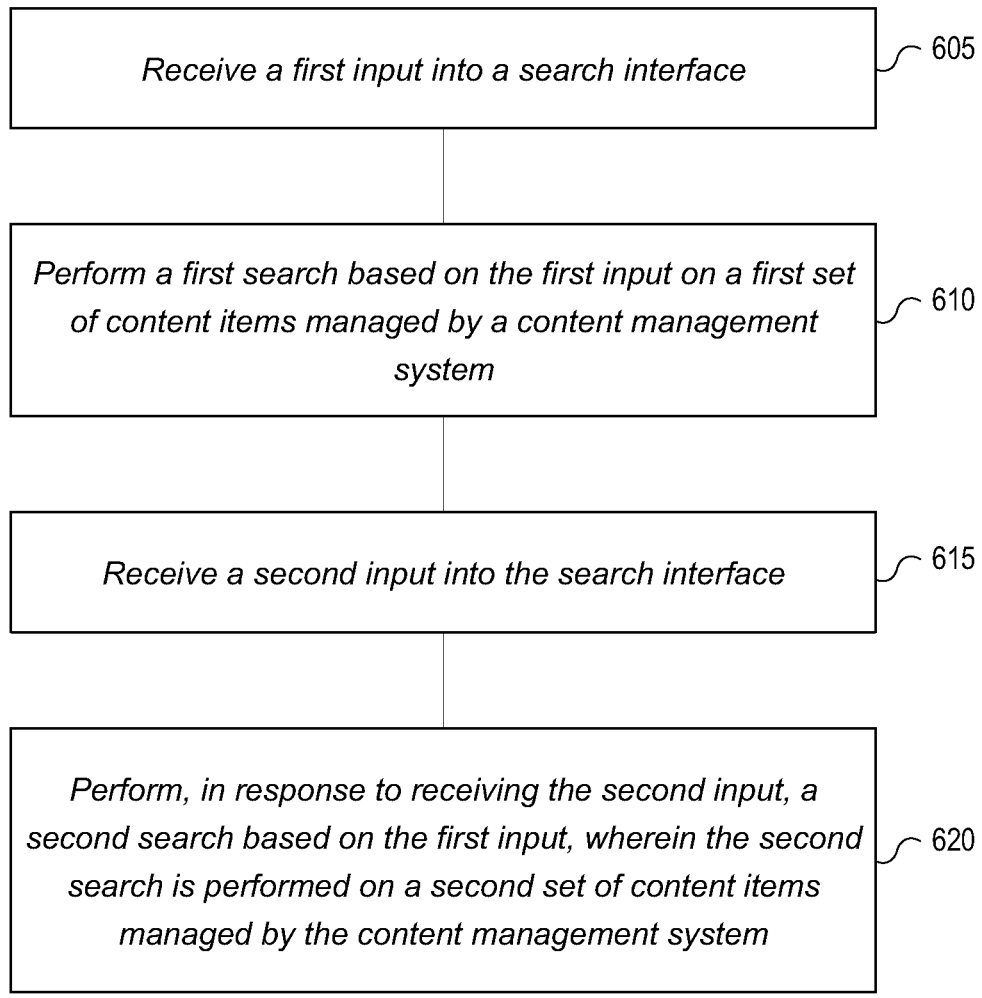
FIG. 6 shows an example method for performing a hybrid search, in accordance with various embodiments of the subject technology.

FIG. 6 shows an example method 600 for performing a hybrid search, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, client device 150 running client application 152 of FIG. 1.

At operation 605, the system receives a first input into a search interface. The first input may be, for example, textual input. As the use inputs the first input into the search input, the system may dynamically perform a first search of a first set of content items managed by a content management system based on the first input at operation 610. The results of the first search may be updated as additional first input is received in the search interface (e.g., as the user types the search term) and provided in a first area of the client application.

The first set of content items may be, for example, content items that have been accessed within a recent period and/or content items located on the system. According to some embodiments, each content item associated with the content management system may be tagged with a timestamp for a user's last access. The system may identify content items accessed within a recent period (e.g., the past 24 hours, the past week, etc.) based on the timestamp. The system may search for content items located on a client device by using search functionality provided by the operating system via, for example, a file system extension running on the client device. Alternatively, the system may search for content items located on the client device using a client application running on the client device configured to locate content items associated with the content management system.

As noted above, the content management system may manage multiple versions of content items across multiple user devices as well as versions stored on a content management system server. The content management system attempts to synchronize the multiple versions, if possible. However, there may be a number of reasons that one or more versions may not be synchronized or up to date (e.g., a client machine may be offline for a period of time). Accordingly, the search results include content items that are local to the system, some of the content items may not be synchronized or up to date.

According to some embodiments, if the system receives a user selection of a local content item in the search results, the system may determine whether the selected content item is a current up to date version or a synchronized version. For example, the system may interface with the content management system and compare the local content item with a version of the content item stored by the content management system. If the two versions match, the local version is up to date and may be used. If the version of the content item stored by the content management system is a more recent version, the system may retrieve that version from the content management system to provide to the user and store locally. If the local version of the content item a more recent version, the system may provide the local version for the user as well as upload the local version of the content item to the content management system so that the most recent version of the content item may be stored by the content management system.

Returning to FIG. 6, at operation 615, the system may receive a second input into the search interface. For example, the second input is an enter key input. In response to receiving the second input, a second search based on the first input may be performed at operation 620. The second search may performed on a second set of content items managed by the content management system and a second set of search results may be provided in the same or a separate area of the client application.

The second set of content items may be, for example, all content items that the user has access to and/or content items stored remotely by the content management system. In order to search the remotely stored content items, the system may transmit, via a network, a search request comprising the first input to the content management system and receive a set of search results from the content management system. The search results from the content management system may then be combined with any search results generated by the system for locally stored content items and provided to the user.

Figure 7:
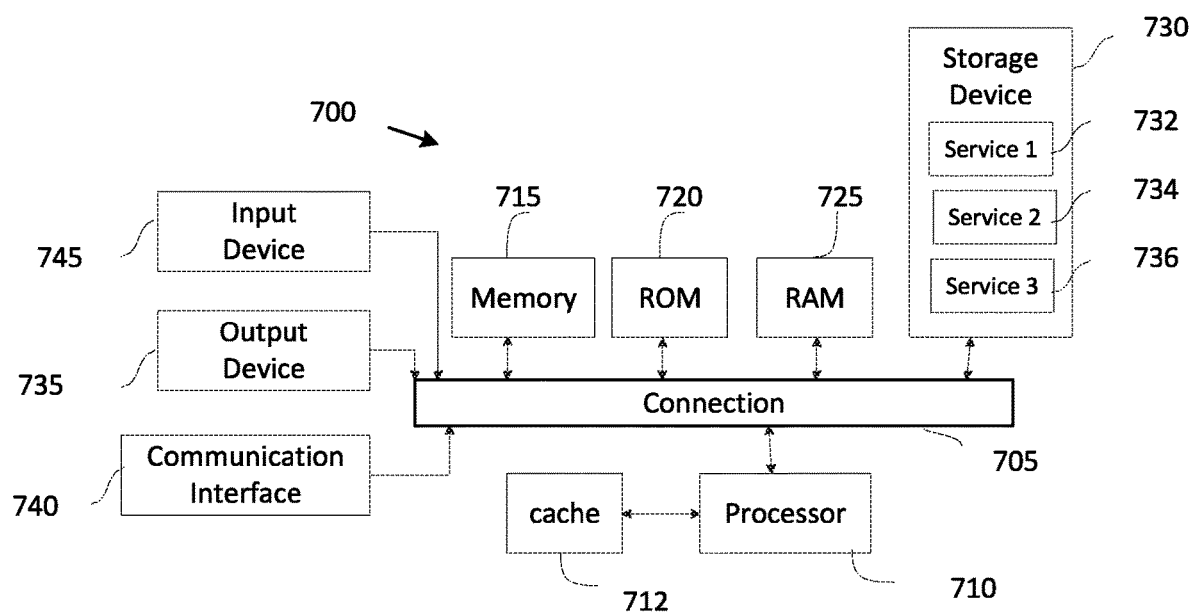
FIG. 7 shows an example of a system for implementing certain aspects of the present technology.

FIG. 7 shows an example of computing system 700 in which the components of the system are in communication with each other using connection 705. Connection 705 can be a physical connection via a bus, or a direct connection into processor 710, such as in chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, by a client application on a computing device, a plurality of first inputs into a search interface of the client application, the client application including a workspace for content items managed by a content management system and a navigation bar that includes the search interface, and the client application is associated with a user account of the content management system;
   performing, by the client application on the computing device, a dynamic first search based on each of the plurality of first inputs, wherein the dynamic first search is performed on a first set of content items managed by the content management system and having a first characteristic, the first set of content items stored locally on the computing device;
   returning a first search result to a search result interface associated with the navigation bar, based on the dynamic first search;
   after returning the first search result to the search result interface, receiving, by the client application on the computing device, a second input into the search interface;
   determining, by the client application, a second search mode based on at least one alternate search criteria for a second search; and
   initiating, by the client application on the computing device and in response to receiving the second input, the second search including each of the plurality of first inputs and according to the second search mode using a second characteristic, wherein the second search is performed on a second set of content items managed by the content management system and having the second characteristic.

2. The computer-implemented method of claim 1, wherein each of the at least one first inputs is textual input.

3. The computer-implemented method of claim 1, wherein the second input is an enter key input, and wherein the second characteristic includes the second set of content items managed by the content management system being stored locally on the computing device.

4. The computer-implemented method of claim 1, wherein the first input and the second input are received in a same field of the search interface.

5. The computer-implemented method of claim 1, wherein the first set of content items is smaller than the second set of content items.

6. The computer-implemented method of claim 1, further comprising:
   generating a first set of search results based on the plurality of first inputs and the first set of content items that are located on the computing device;
   presenting the first set of search results;
   receiving a selection of a content item from the first set of search results that are located on the computing device; and
   providing user access to the content item located on the computing device.

7. The computer-implemented method of claim 6, further comprising:
   receiving a determination, via the content management system, of whether the selected content item is a current version.

8. The computer-implemented method of claim 7, further comprising when the received determination is that the selected content item is not the current version, retrieving, the current version of the content item from the content management system.

9. The computer-implemented method of claim 1, wherein the first characteristic includes the first set of content items managed by the content management system having been accessed within a specified period of time.

10. The computer-implemented method of claim 1, wherein the initiating of the second search comprises:
    transmitting, via a network, a search request comprising the first input and the at least one alternative search criteria to the content management system; and
    receiving a set of search results from the content management system.

11. The computer-implemented method of claim 1, further comprising:
    providing the first search result for the dynamic first search in the search result interface associated with the navigation bar; and
    providing a second search result for the second search in the workspace of client application, wherein the workspace and the navigation bar are different.

12. A system comprising:
    one or more processors; and
    a non-transitory computer-readable medium storing instructions that, when executed by the one or more processors, cause the one or more processors to:
    receive a plurality of first inputs into a search interface of a client application, the client application including a workspace for content items managed by a content management system and a navigation bar that includes the search interface, and the client application is associated with a user account of a content management system;
    perform a dynamic local search based on each of the plurality of first inputs, wherein the dynamic local search is performed on a first set of content items located on the system and having a first characteristic;

return a first search result to a search result interface associated with the navigation bar, based on the dynamic local search;

after returning the first search result to the search result interface, receive a second input into the search interface of the client application;

determine, by the client application, a second search mode based on at least one alternate search criteria for a global search; and initiate, in response to receiving the second input, the global search, the global search including each of the plurality of first inputs and according to the second search mode using a second characteristic, wherein the global search is performed on a second set of content items, having the second characteristic.

13. The system of claim 12, wherein the instructions further cause the processor to:

generate a set of search results including at least one content item located on the system;

present the set of search results to a user;

receive a selection of the at least one content item located on the system; and provide the at least one content item located on the system for the user.

14. The system of claim 13, wherein the instructions further cause the processor to:

receive a determination, via the content management system, that the at least one content item located on the system is not a current version; and retrieve, based on the determination, the current version of the content item from the content management system.

15. The system of claim 13, wherein the instructions further cause the processor to:

compare at least one content item located on the system with a remote version of the content item stored by the content management system;

retrieve, when the remote version of the content item is more recent than the at least one content item located on the system, the remote version of the content item from the content management system; and transmit, when the at least one content item located on the system is more recent than the remote version of the content item, the at least one content item located on the system to the content management system.

16. The system of claim 12, wherein the instructions further cause the processor to:

provide the first search result for the local search in the search result interface associated with the navigation bar; and provide a second search result for the global search in the workspace of the client application, wherein the workspace and the navigation bar are different.

17. A non-transitory computer readable medium comprising instructions, the instructions, when executed by a computing system, cause the computing system to:

receive a plurality of first inputs into a search interface of a client application, the client application including a workspace for content items managed by a content management system and a navigation bar that includes the search interface, and the client application is associated with a user account of a content management system;

perform a dynamic first search based on each of the plurality of first inputs, wherein the first search is performed on a first set of content items managed by the content management system and having a first characteristic, the first set of content items stored locally on the computing system;

return a first search result to a search result interface associated with the navigation bar, based on the dynamic first search;

after returning the first search result to the search result interface, receive a second input into the search interface of the client application;

determine, by the client application a second search mode based on at least one alternate search criteria for a second search; and initiate, in response to receiving the second input, the second search including each of the plurality of first inputs and according to the second search mode including a second characteristic, wherein the second search is performed on a second set of content items managed by the content management system having the second characteristic.

18. The non-transitory computer readable medium of claim 17, wherein the instructions further cause the computing system to:

generate a first set of search results;

provide the first set of search results to the search result interface associated with the navigation bar of the client application, wherein the first set of search results includes at least one content item located on the system;

receive a selection of the at least one content item located on the system; and provide the selected at least one content item located on the system for the user.

19. The non-transitory computer readable medium of claim 17, wherein the instructions further cause the computing system to:

generate a second set of search results based on the plurality of first inputs and the second set of content items; and provide the second set of search results in workspace of the client application, wherein the workspace and the navigation bar are different.

20. The non-transitory computer readable medium of claim 18, wherein the instructions further cause the computing system to:

receive a determination that there is an updated version of the selected at least one content item; and retrieve the updated version of the selected at least one content item from the content management system.

21. The computer-implemented method of claim 1, wherein the first search result is dynamically updated by the client application based on each of the plurality of first inputs.

22. The computer implemented method of claim 1, wherein the first set of content items and the second set of content items are collaboration content items.

23. The computer implemented method of claim 22, wherein the first set of content items are created using an interface element of the client application.

24. The computer implemented method of claim 22, wherein the collaboration content items are accessible to the first user account and a second user account.

* * * * *